United States Patent
Kim et al.

(10) Patent No.: US 10,363,918 B2
(45) Date of Patent: Jul. 30, 2019

(54) METHOD FOR CONTROLLING TORQUE REDUCTION OF HYBRID VEHICLE

(71) Applicant: Hyundai Motor Company, Seoul (KR)

(72) Inventors: Do Hee Kim, Gyeonggi-do (KR); Teh Hwan Cho, Gyeonggi-do (KR); Gwang Il Du, Incheon (KR)

(73) Assignee: Hyundai Motor Company, Seoul (KR)

( * ) Notice: Subject to any disclaimer, the term of this patent is extended or adjusted under 35 U.S.C. 154(b) by 327 days.

(21) Appl. No.: 15/354,963

(22) Filed: Nov. 17, 2016

(65) Prior Publication Data
US 2017/0349163 A1    Dec. 7, 2017

(30) Foreign Application Priority Data
Jun. 2, 2016 (KR) .................. 10-2016-0068766

(51) Int. Cl.
*B60W 20/13* (2016.01)
*B60L 50/16* (2019.01)
*B60L 58/13* (2019.01)

(52) U.S. Cl.
CPC .............. *B60W 20/13* (2016.01); *B60L 50/16* (2019.02); *B60L 58/13* (2019.02);
(Continued)

(58) Field of Classification Search
USPC ........................................................... 701/22
See application file for complete search history.

(56) References Cited

U.S. PATENT DOCUMENTS

2003/0052650 A1*  3/2003  Gunji .................. B60K 1/02
                                                       320/155
2006/0113129 A1*  6/2006  Tabata ................ B60K 6/365
                                                       180/65.25
(Continued)

FOREIGN PATENT DOCUMENTS

JP    2006-144589 A    6/2006
JP    2013-133085 A    7/2013
(Continued)

OTHER PUBLICATIONS

Kim, Do Hee et al., "Integrated Torque Intervention Control for Maximizing Efficiency of Power Sources for HEVs (Hybrid Electric Vehicles)", 2015 Hyundai-Kia International Powertrain Conference, Oct. 27-28, 2015, English Abstract, 8 pages.

*Primary Examiner* — James M McPherson
(74) *Attorney, Agent, or Firm* — Mintz Levin Cohn Ferris Glovsky and Popeo, P.C.; Peter F. Corless

(57) ABSTRACT

A method for controlling torque reduction of a hybrid vehicle includes: determining a discharging torque control factor of a motor and a charging torque control factor of the motor based on a current state of charge of a battery that supplies electric power to the motor and a threshold state of charge of the battery; calculating a torque of the motor corresponding to driving torque reduction request of a traction control system (TCS) based on a discharging limit torque of the motor that the discharging torque control factor is reflected in and a charging limit torque of the motor that the charging torque control factor is reflected in; and calculating a torque of the engine corresponding to the driving torque reduction request based on the calculated torque of the motor and a request torque of the traction control system.

7 Claims, 6 Drawing Sheets

(52) U.S. Cl.
CPC ... *B60L 2240/423* (2013.01); *B60L 2240/443* (2013.01); *B60W 2510/244* (2013.01); *B60W 2710/0666* (2013.01); *B60W 2710/083* (2013.01); *B60W 2720/26* (2013.01); *B60Y 2300/18175* (2013.01); *B60Y 2300/91* (2013.01); *B60Y 2400/112* (2013.01); *Y02T 10/642* (2013.01); *Y02T 10/70* (2013.01); *Y02T 10/7005* (2013.01); *Y02T 10/705* (2013.01); *Y02T 10/7044* (2013.01); *Y02T 10/7077* (2013.01)

(56) References Cited

U.S. PATENT DOCUMENTS

| | | | | |
|---|---|---|---|---|
| 2013/0226389 A1* | 8/2013 | Yamazaki | ............. | B60K 6/445 |
| | | | | 701/22 |
| 2013/0313897 A1* | 11/2013 | Garofalo | ............. | B60L 1/02 |
| | | | | 307/10.1 |
| 2016/0318385 A1* | 11/2016 | Terayama | ............. | B60W 10/08 |

FOREIGN PATENT DOCUMENTS

KR         10-1490954 B1     2/2015
KR    10-2016-0045496 A     4/2016

\* cited by examiner

METHOD FOR CONTROLLING TORQUE REDUCTION OF HYBRID VEHICLE

CROSS-REFERENCE TO RELATED APPLICATION

This application claims under 35 U.S.C. § 119(a) the benefit of Korean Patent Application No. 10-2016-0068766 filed in the Korean Intellectual Property Office on Jun. 2, 2016, the entire contents of which are incorporated herein by reference.

BACKGROUND

(a) Technical Field

The present invention relates to a hybrid vehicle (or a hybrid electric vehicle), and more particularly, to a method for controlling torque reduction of a hybrid vehicle.

(b) Description of the Related Art

A hybrid vehicle is a vehicle using two or more different types of power sources, and is typically driven by an engine that obtains a driving torque by burning fuel and a motor that obtains a driving torque by battery power.

The hybrid vehicle can be provided with optimum output torque, depending on how the engine and the motor are operated while the vehicle is driven by the two power sources, that is, the engine and the motor.

A traction control system (TCS) is a safety system for preventing wheel spin and improving driving stability by controlling the brakes and the engine during takeoff or acceleration. The TCS is typically provided with the hybrid vehicle and requests to limit driving torque when the wheel spin occurs during takeoff or acceleration. Particularly, the hybrid vehicle is provided with two power sources. i.e., the engine and the motor, so the engine and the motor may be utilized when the TCS requests to limit the driving torque.

Conventionally, if a request to limit the driving torque by the TCS is generated, the hybrid vehicle decreases an engine torque at first. Then, if the decreased engine torque cannot satisfy an amount of the request to limit the driving torque by the TCS, the hybrid vehicle decreases a motor torque to satisfy the amount of the request to limit the driving torque by the TCS.

However, in case that the request to limit the driving torque by the TCS is satisfied by using the motor torque after the engine torque becomes 0, a state of charge (SOC) of the battery may run out due to continuous use of the motor, so output performance of the motor is deteriorated. Moreover, a demand torque of a driver cannot be satisfied while the TCS is continuously operating, so the hybrid vehicle cannot start smoothly again.

The above information disclosed in this Background section is only for enhancement of understanding of the background of the invention and therefore it may contain information that does not form the prior art that is already known in this country to a person of ordinary skill in the art.

SUMMARY

The present invention provides a method for controlling torque reduction of a hybrid vehicle which is capable of decreasing (or preventing) an abnormal noise of an engine and maintaining a state of charge (SOC) of a battery.

An exemplary embodiment of the present invention may provide the method for controlling torque reduction of the hybrid vehicle including a motor and the engine as a power source, including: determining, by a controller, a discharging torque control factor of the motor and a charging torque control factor of the motor based on a current state of charge of a battery that supplies an electric power to the motor and a threshold state of charge of the battery; calculating, by the controller, a torque of the motor corresponding to driving torque reduction request of a traction control system (TCS) based on a discharging limit torque of the motor that the discharging torque control factor is reflected in and a charging limit torque of the motor that the charging torque control factor is reflected in; and calculating, by the controller, a torque of the engine corresponding to the driving torque reduction request based on the calculated torque of the motor and a request torque of the traction control system. A target state of charge included in the threshold state of charge may be a state of charge that prevents an abnormal noise of the engine and maintains a state of charge of the battery.

A limit state of charge included in the threshold state of charge may be a state of charge that prevents deterioration of life of the battery.

When the current state of charge is less than or equal to the limit state of charge, the controller may determine the discharging torque control factor as zero or a value close to zero, the controller may determine the charging torque control factor as 1 or a value close to 1, and the controller may determine the torque of the motor as a value obtained by adding up a product of the discharging limit torque and the determined discharging torque control factor and a product of the charging limit torque and the determined charging torque control factor.

When the current state of charge is greater than the limit state of charge and the current state of charge is less than the target state of charge, the controller may determine the discharging torque control factor as a value between zero and 1, the controller may determine the charging torque control factor as a value between zero and 1, and the controller may determine the torque of the motor as a value obtained by adding up a product of the discharging limit torque and the determined discharging torque control factor and a product of the charging limit torque and the determined charging torque control factor. The determined discharging torque control factor may be a value that increases towards 1 when a state of charge of the battery increases and the determined charging torque control factor may be a value that decreases towards zero when the state of charge of the battery increases.

When the current state of charge is greater than or equal to the target state of charge, the controller may determine the discharging torque control factor as 1 or a value close to 1, may determine the charging torque control factor as a value between zero and 1, and may determine the torque of the motor as a value obtained by adding up a product of the discharging limit torque and the determined discharging torque control factor and a product of the charging limit torque and the determined charging torque control factor. The determined charging torque control factor may be a value that quickly approaches zero when a state of charge of the battery increases.

The controller may calculate the torque of the engine by subtracting the calculated torque of the motor from the request torque of the traction control system.

The method for controlling torque reduction of the hybrid vehicle according to the exemplary embodiment of the present invention, which is a technique that controls a driving torque required by a traction control system (TCS), may improve follow-up performance of a torque required by a driver of the vehicle by using maintenance (or balancing) of the state of charge (SOC) of the battery, may improve driving performance of the vehicle in a winter road, and may decrease (or prevent) the abnormal noise of the engine.

A further exemplary embodiment of the present invention may provide a non-transitory computer readable medium containing program instructions executed by a processor, the computer readable medium including: program instructions that determine a discharging torque control factor of a motor and a charging torque control factor of the motor based on a current state of charge of a battery that supplies an electric power to the motor and a threshold state of charge of the battery; program instructions that calculate a torque of the motor corresponding to driving torque reduction request of a traction control system (TCS) based on a discharging limit torque of the motor that the discharging torque control factor is reflected in and a charging limit torque of the motor that the charging torque control factor is reflected in; and program instructions that calculate a torque of an engine corresponding to the driving torque reduction request based on the calculated torque of the motor and a request torque of the traction control system, wherein a target state of charge included in the threshold state of charge is a state of charge that prevents an abnormal noise of the engine and maintains a state of charge of the battery.

BRIEF DESCRIPTION OF THE DRAWINGS

A brief description of the drawings will be provided to more sufficiently understand the drawings which are used in the detailed description of the present invention.

DETAILED DESCRIPTION OF THE EMBODIMENTS

Figure 1:
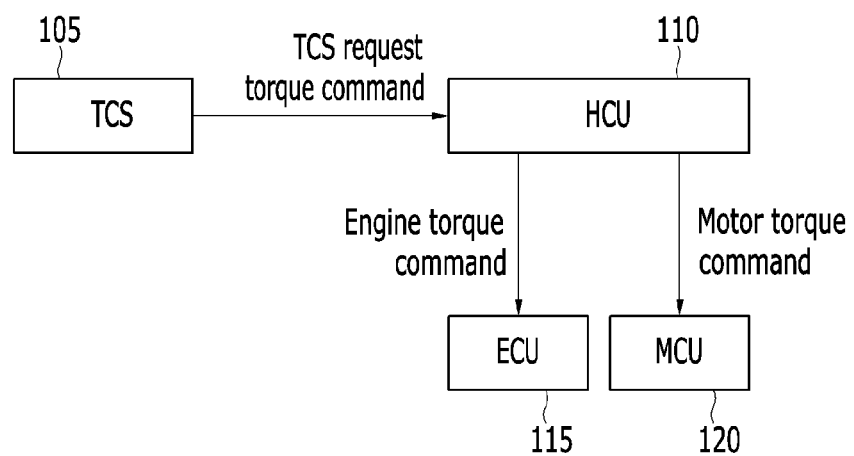
FIG. 1 is a block diagram of a device for controlling torque reduction of a hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Throughout this specification and the claims that follow, when it is described that an element is "coupled" to another element, the element may be "directly coupled" to the other element or "electrically or mechanically coupled" to the other element through a third element.

In order to control a wheel slip that occurs in poor road conditions (e.g., wet pavement, or a snow/ice covered road), a traction control system (TCS) performs a torque intervention control (or a torque reduction control) to reduce a driving torque.

The driving torque is reduced so that a shock that is delivered to a final gear (or a final reduction gear) because of the wheel slip is reduced and an intention of a driver of a vehicle is satisfied by securing proper driving torque.

Torque intervention control of the TCS according to the related art is described as follows.

In order to reduce the driving torque that the TCS requires, a torque of an engine is reduced at first, and a torque of a motor is reduced if the engine torque cannot satisfy the driving torque. When the motor torque is reduced, a state of charge (SOC) of a battery which supplies electric power to the motor can be rapidly lowered. Thus, driving torque of the vehicle can be limited (or lost), restart performance of the vehicle can be lowered, and an abnormal noise (or an abnormal sound) of the engine can be increased because the battery should be charged by using the engine.

In order to charge the battery, the engine generates a plus torque (a positive torque) and the motor generates a minus torque (a negative torque). A torsional torque is generated due to a large difference between the plus torque and the minus torque, and the torsional torque causes the abnormal noise of the engine.

If the SOC of the battery is lowered, the driving performance of the vehicle is sharply lowered because a driver requested torque cannot be carried out. Therefore, a control of driving torque requested by the TCS that maintains the SOC of the battery is required.

A control technique related to the TCS of a hybrid vehicle according to the related art can maintain the SOC of the battery to improve follow-up performance of a driver requested torque, and ensure that the driver requested torque is carried out. However, the abnormal noise of the engine can be further deteriorated when the battery is excessively charged in order to maintain the SOC of the battery.

Therefore, in order to improve the follow-up performance of the driver requested torque and to reduce the abnormal noise of the engine, a control for maintaining the SOC of the battery is required.

In order to prevent the driver requested torque from not being followed up because of over-discharge of the battery, a related art performs a control for maintaining the SOC of the battery. However, excessive charging for maintenance of the SOC of the battery causes an excessive difference between the engine torque that is a positive number and the motor torque that is a negative number, thereby generating the abnormal noise.

Therefore, in order to improve follow-up performance of the driver requested torque and to decrease the abnormal noise according to maintenance of the SOC of the battery, a control that determines a target SOC of the battery and maintains the SOC of the battery as the target SOC is required.

Figure 6:
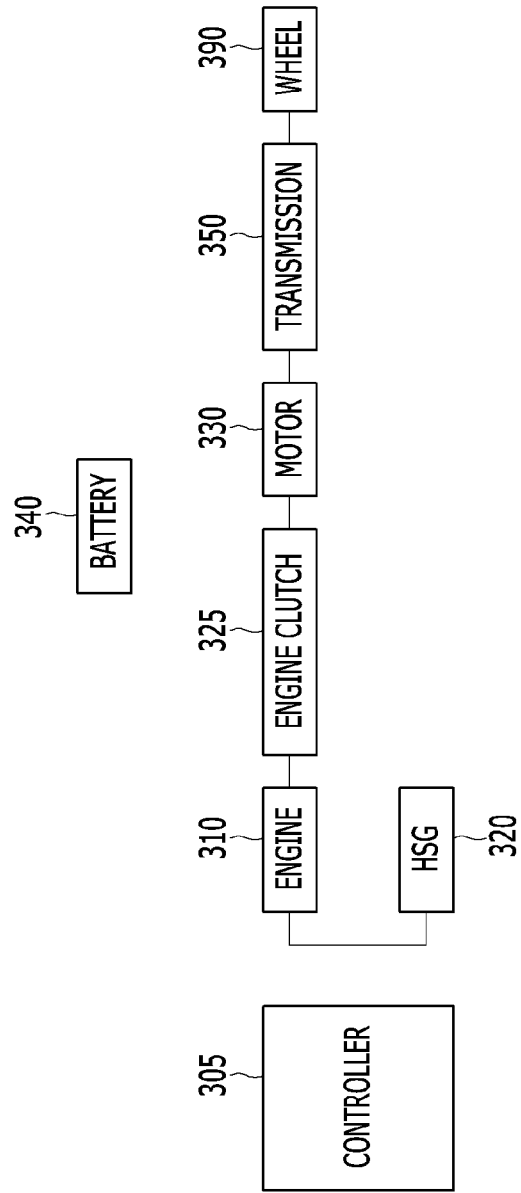
FIG. 6 is a block diagram of the hybrid vehicle including the device for controlling torque reduction according to an exemplary embodiment of the present invention.

FIG. 1 is a block diagram of a device for controlling torque reduction of a hybrid vehicle according to an exemplary embodiment of the present invention. FIG. 6 is a block diagram of the hybrid vehicle including the device for controlling torque reduction according to an exemplary embodiment of the present invention.

Referring to FIGS. 1 and 6, the device for controlling torque reduction of the hybrid vehicle 300 includes a traction control system (TCS) 105, a hybrid control unit (HCU) 110, an engine control unit (ECU) (or an engine management system (EMS)) 115, and a motor control unit (MCU) 120.

The TCS (or a brake control unit (BCU)) 105 may transmit a request torque command for a control by the TCS to the HCU 110 according to a wheel slip. The TCS 105, which is a system for controlling an excessive driving torque of the vehicle that occurs when the vehicle is started or accelerated on a slippery road such as a snowy road or in rain so that a tire (or a wheel) does not slip, may operate when the tire slips, when there is a difference between number of revolutions of a right tire and number of revolutions of a left tire, or when the tire is punctured. The TCS 105 may prevent slip of driving wheels 390, and may output a demand torque that limits the driving torque of the vehicle to request a torque reduction when a tire of the hybrid vehicle 300 slips.

The HCU 110 may calculate a reduced driving torque so that a drive torque output before the wheel slip may follow up a TCS request torque. The HCU 110 may determine a torque of an engine and a torque of a motor so that The HCU may effectively reduce a driving torque of two power sources. The HCU 110 may transmit the determined engine torque command to the ECU 115 and may transmit the determined motor torque command to the MCU 120.

The hybrid vehicle 300 includes the TCS 105, a controller 305, the engine 310, a hybrid starter-generator (HSG) 320, an engine clutch 325, the motor (or a driving motor) 330 which may be an electric motor, a battery 340, a transmission 350, and wheels (or driving wheels) 390.

The hybrid vehicle 300, which is a hybrid electric vehicle, may use the engine 310 and the motor 330 as power sources, and includes the engine clutch 325 existing between the engine 310 and the motor 330 so that the hybrid vehicle 300 may be operated in the electric vehicle (EV) mode in which the hybrid vehicle 300 travels by the motor 330 in a state where the engine clutch 325 is opened, and in a hybrid electric vehicle (HEV) mode in which the hybrid vehicle 300 is capable of travelling by both the motor 330 and engine 310 in a state where the engine clutch 325 is closed.

The hybrid vehicle 300 may include a power train of a transmission mounted electric device (TMED) type in which the motor 330 is connected to the transmission 350. The hybrid vehicle 300 may provide a driving mode, such as the EV mode, which is the electric vehicle mode using only power of the motor, and the HEV mode, which uses rotational force of the engine as main power and uses rotational force of the motor as auxiliary power depending on whether the engine clutch 325 that is disposed between the engine 310 and the motor 330 is engaged (or connected). In particular, in the hybrid vehicle 300 including a structure in which the motor 330 may be directly connected to the transmission 350, revolutions per minute (RPM) of the engine may be increased by drive of the HSG 320, power delivery and power cutoff between the engine and the motor may be performed via engagement and release of the clutch 325, a driving force may be transmitted (or transferred) to the wheels 390 through a power transmission system which may include the transmission 350, and torque of the engine may be transmitted to the motor via engagement of the clutch 325 when transmission of the engine torque is requested.

The controller 305 may include the HCU 110, the MCU 120, the ECU 115, and a transmission control unit (TCU).

The HCU 110 may control starting of the engine by controlling the HSG 320 when the engine 310 stops. The HCU 110 may be the highest controller, and may synthetically control controllers (for example, the MCU) connected to a network such as a controller area network (CAN) which is a vehicle network, and may control overall operation of the hybrid vehicle 300.

The MCU 120 may control the HSG 320 and the motor 330. The MCU 120 may control an output torque of the driving motor 330 through the network depending on the control signal output from the HCU, and thus may control the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter converts a direct current (DC) voltage that is supplied from the battery 340 into a three-phase alternating current (AC) voltage to drive the driving motor 330. The MCU may be disposed between the battery 340 and the motor 330.

The ECU may control a torque of the engine 310. The ECU may control an operating point (or a driving point) of the engine 110 through the network depending on a control signal output from the HCU, and may control the engine 310 to output an optimal torque. The TCU may control an operation of the transmission 350.

For example, the controller 305 may be one or more microprocessors operated by a program or hardware including the microprocessor. The program may include a series of commands for executing a method for controlling torque reduction of the hybrid vehicle according to an exemplary embodiment of the present invention, which will be described below.

The engine 310 may include a diesel engine, a gasoline engine, a liquefied natural gas (LNG) engine, or a liquefied petroleum gas (LPG) engine, and may output a torque at the operating point depending on a control signal output from the ECU. The torque may be combined with driving force of the driving motor 330 in the HEV mode.

The engine 310 may be connected to the motor 330 via the engine clutch 325 to generate a power transmitted to the transmission 350.

The HSG 320 may operate as a motor depending on a control signal output from the MCU to start the engine 310, and may operate as a generator in a state in which start of the engine 310 is maintained to provide generated electric power to the battery 340 via the inverter. The HSG 320 may be connected to the engine 310 through a belt.

The engine clutch 325 may be disposed (or mounted) between the engine 310 and the driving motor 330, and may be operated to switch power delivery between the engine 310 and the motor 330. The engine clutch 125 may connect or intercept power between the engine and the motor depending on switching of the HEV mode and the EV mode. Operation of the engine clutch 325 may be controlled by the controller 305.

The motor 330 may be operated by a three-phase AC voltage that is output from the MCU to generate a torque. The motor 330 may be operated as a generator during coasting drive or regenerative braking to supply a voltage (or regenerative energy) to the battery 340.

The battery 340 may include a plurality of unit cells. A high voltage for providing a driving voltage (for example, 350-450 V DC) to the motor 130 that provides driving power to the wheels 190 may be stored in the battery 340.

The transmission 350 may include a multiple speed transmission, such as an automatic transmission or a dual clutch transmission (DCT), or a continuously variable transmission (CVT), and may shift to a desired gear by using hydraulic pressure depending on control of the TCU to operate engagement elements and disengagement elements. The transmission 350 may transmit driving force of the engine 310 and/or the motor 330 to the wheels 390, and may intercept power delivery between the motor 330 (or the engine 310) and the wheels 390.

Figure 2:
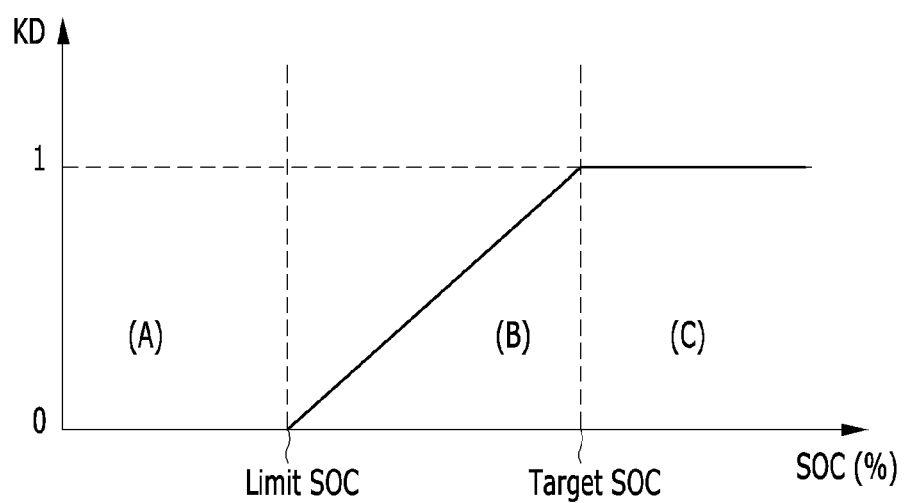
FIG. 2 is a graph describing an exemplary embodiment of a discharging torque control factor for calculating a motor torque command shown in FIG. 1.
Figure 3:
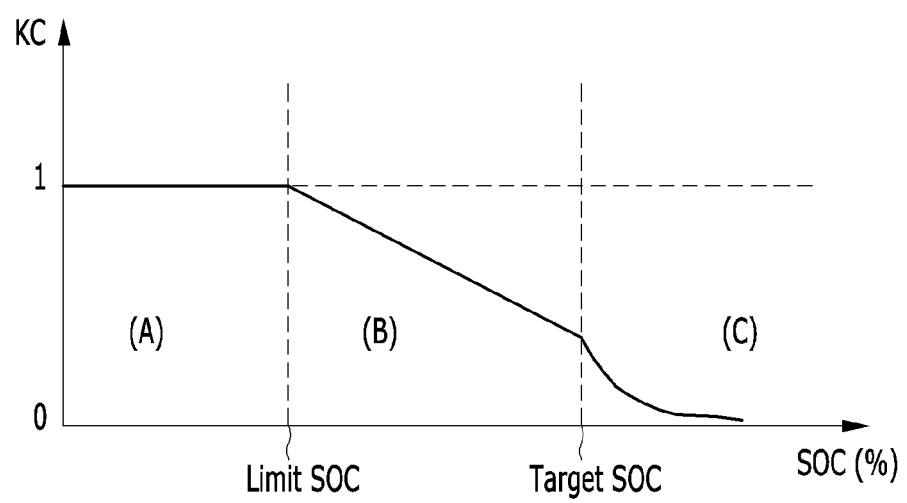
FIG. 3 is a graph describing an embodiment of a charging torque control factor for calculating a motor torque command shown in FIG. 1.
Figure 4:
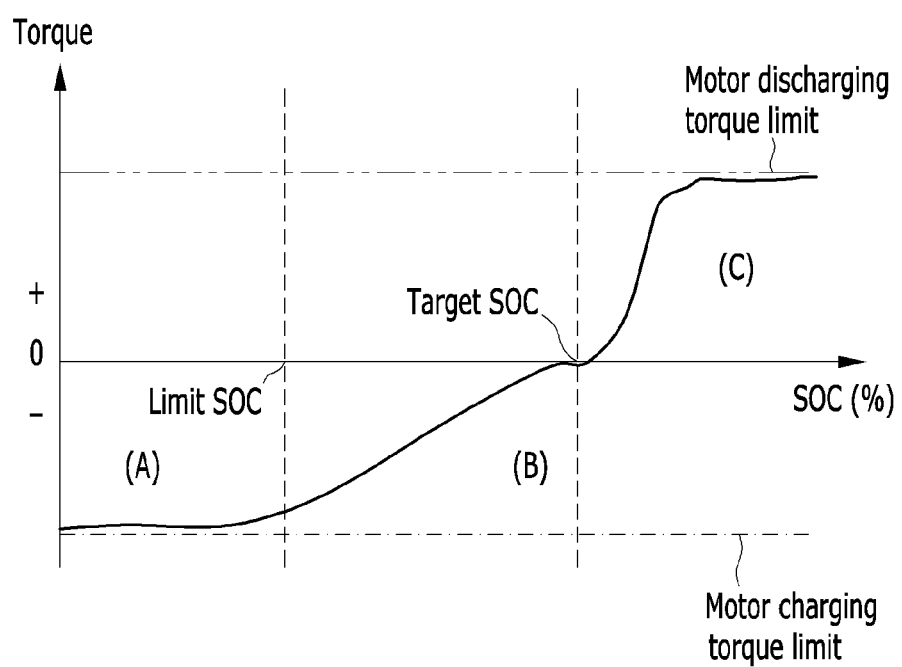
FIG. 4 is a graph describing a motor torque which is determined by the discharging torque control factor shown in FIG. 2 and the charging torque control factor shown in FIG. 3.

FIG. 2 is a graph describing an exemplary embodiment of a discharging torque control factor for calculating the motor torque command shown in FIG. 1. FIG. 3 is a graph describing an embodiment of a charging torque control factor for calculating the motor torque command shown in FIG. 1. FIG. 4 is a graph describing the motor torque which is determined by the discharging torque control factor shown in FIG. 2 and the charging torque control factor shown in FIG. 3.

Referring to FIGS. 2, 3, 4, and 6, when a current state of charge (SOC) of the battery 340 is placed in an A area that is less than or equal to a limit state of charge (SOC), the discharging torque control factor KD may be 0 or a value close to 0, the charging torque control factor KC may be 1 or a value close to 1, and the torque of the motor 330 may be a value obtained by a product of a discharging limit torque of the motor and the KD and a product of a charging limit torque of the motor and the KC. The limit SOC included in a threshold state of charge (SOC) of the battery 340 may be a state of charge (SOC) that prevents deterioration of life of the battery, an SOC that prevents deterioration of fuel efficiency of the hybrid vehicle, or an SOC that cannot accelerate the hybrid vehicle. The limit SOC may be determined by a test.

The discharging limit torque of the motor may mean a maximum torque value of the motor that may generate a maximum discharging value of the battery 340. The charging limit torque of the motor may mean a maximum torque value of the motor (or a maximum reverse torque of the motor) that may generate a maximum charging value of the battery 340.

When the current SOC of the battery 340 is placed in a B area that is greater than the limit SOC and the current SOC is less than a target state of charge (SOC), the discharging torque control factor KD, which may be a value between 0 and 1, may be a value that increases towards 1 when a state of charge (SOC) of the battery 340 increases, and the charging torque control factor KC, which may be a value between 0 and 1, may be a value that decreases towards 0 when the state of charge of the battery increases. The torque of the motor 330 may be a value obtained by adding up a product of the discharging limit torque and the KD and a product of the charging limit torque and the KC. The target SOC included in a threshold state of charge (SOC) of the battery 340 may be a state of charge (SOC) that prevents an abnormal noise of the engine 310 and maintains the state of charge (SOC) of the battery or a minimum value of an SOC that follows up a torque required by a driver of the vehicle. The abnormal noise may be generated when the battery 340 is charged. The target SOC may be determined by a test. The driver's required torque may be detected by an acceleration pedal position sensor included in the hybrid vehicle.

When the current SOC of the battery 340 is located in a C area that is greater than or equal to the target SOC, the discharging torque control factor KD may be 1 or a value close to 1, and the charging torque control factor KC, which may be a value between 0 and 1, may be a value that relatively quickly approaches 0 when a state of charge (SOC) of the battery increases. The torque of the motor 330 may be a value obtained by adding up a product of the discharging limit torque and the KD and a product of the charging limit torque and the KC.

The charging torque control factor KC and the discharging torque control factor KD may be a value used for torque control (or torque adjustment) by using the limit SOC and the target SOC, and the limit SOC and the target SOC may be a threshold value used for charging torque adjustment and discharging torque adjustment. The discharge limit torque and the charge limit torque of the motor may be determined by a minimum torque and a maximum torque of the motor that are determined based on a limitation according to a type of the motor system, a limitation according to the battery power, or a limitation according to the threshold SOC of the battery.

As described above, the embodiment of the present invention may determine the optimal engine torque and the optimal motor torque in order to maintain the SOC of the battery at the target SOC in a reduction control of the drive torque that the TCS requests, thereby securing stable driving torque of the vehicle.

The embodiment of the present invention may determine an optimal drive point of the vehicle by using the discharging limit torque and the charging limit torque of the motor. As shown in the following equation, the embodiment of the present invention may combine (or mix) the discharging limit torque and the charging limit torque according to a change in the battery SOC. The embodiment of the present invention may determine the motor torque at first and may determine the engine torque by using the driving torque that the TCS requires and the determined motor torque. In particular, the embodiment of the present invention may separately control the engine torque and the motor torque when the TCS operates.

The motor torque=the discharging limit torque of the motor×KD+the charging limit torque of the motor×KC.

The engine torque=the request torque of the TCS−the motor torque.

In the equation, the KD is the discharging torque control factor and the KC is the charging torque control factor.

The embodiment of the present invention may determine the discharging limit torque and the charging limit torque of the motor by using the preset limit SOC and the preset target SOC. When the current SOC of the battery is less than or equal to the limit SOC, the KD that is a weighted value of the discharging limit torque may be set to a small value so that an operating point of the motor is advanced in a direction to charge the battery. When the current SOC of the battery is greater than or equal to the target SOC, the KC that is a weighted value of the charging limit torque may be set to a small value, thereby preventing the SOC of the battery from not being greater than the target SOC. When the current SOC of the battery is a value between the limit SOC and the target SOC, the current SOC may be compared with the limit SOC and the target SOC so that weighted values of the discharging limit torque and the charging limit torque may be determined according to a result of the comparison.

Figure 5:
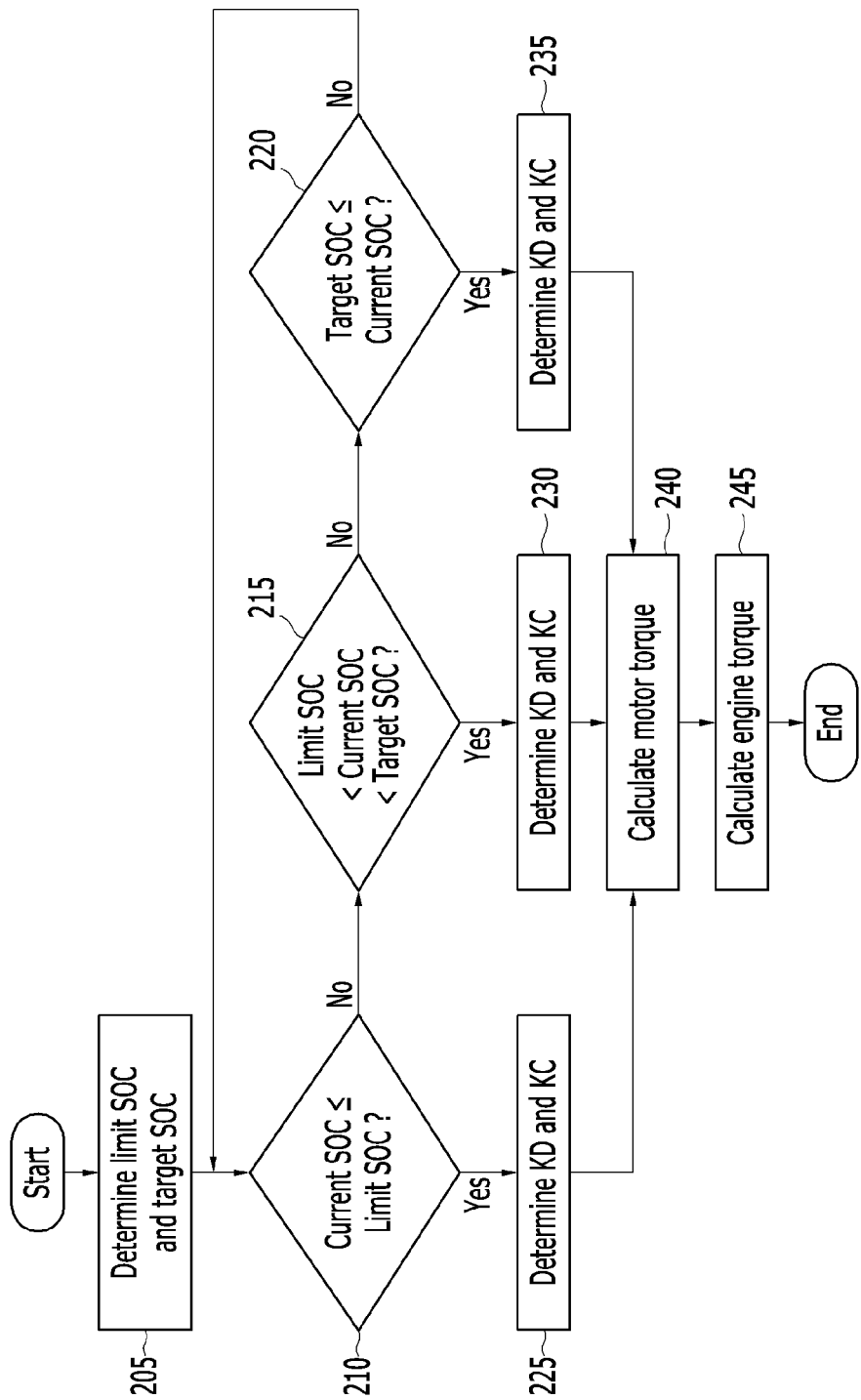
FIG. 5 is a flowchart describing a method for controlling torque reduction of the hybrid vehicle according to an exemplary embodiment of the present invention.

FIG. 5 is a flowchart describing the method for controlling torque reduction of the hybrid vehicle according to an exemplary embodiment of the present invention. The method for controlling torque reduction of the hybrid vehicle may be applied to the device for controlling torque reduction shown in FIG. 1 and the hybrid vehicle 300 shown in FIG. 6.

Referring to FIGS. 1, 5, and 6, in a determination step 205, the limit SOC and the target SOC of the battery that supplies an electric power to the motor 330 may be determined (or set). The limit SOC may be an SOC that prevents deterioration of life of the battery 340 and the target SOC may be an SOC that prevents an abnormal noise of the engine 310 and maintains the SOC of the battery.

According to a comparison step 210, after the limit SOC and the target SOC is set, the controller 305 may determine whether the current SOC of the battery 340 is less than or equal to the limit SOC.

When the current SOC of the battery 340 is less than or equal to the limit SOC, a process that is the method for controlling torque reduction proceeds to a determination step 225. When the current SOC of the battery 340 is not less than or equal to the limit SOC, the process proceeds to a comparison step 215.

According to the determination step 225, the controller 305 may determine (or select) the discharging torque control factor KD as zero or a value close to zero and may determine the charging torque control factor KC as 1 or a value close to 1.

According to the comparison step 215, the controller 305 may determine whether the current SOC of the battery 340 is greater than the limit SOC and the current SOC is less than the target SOC.

When the current SOC of the battery 340 is greater than the limit SOC and the current SOC is less than the target SOC, the process proceeds to a determination step 230. When the current SOC of the battery 340 is not greater than the limit SOC and the current SOC is not less than the target SOC, the process proceeds to a comparison step 220.

According to the determination step 230, the controller 305 may determine the discharging torque control factor KD as a value between zero and 1 and may determine the charging torque control factor KC as a value between zero and 1. The KD may be a value that increases towards 1 when a state of charge (SOC) of the battery 340 increases and the KC may be a value that decreases towards zero when the state of charge of the battery increases.

According to a comparison step 220, the controller 305 may determine whether the current SOC of the battery 340 is greater than or equal to the target SOC.

When the current SOC of the battery 340 is greater than or equal to the target SOC, the process proceeds to a determination step 235. When the current SOC of the battery 340 is not greater than or equal to the target SOC, the process proceeds to the comparison step 210.

According to the determination step 235, the controller 305 may determine the discharging torque control factor KD as 1 or a value close to 1 and may determine the charging torque control factor KC as a value between zero and 1. The KC may be a value that quickly approaches zero when a state of charge (SOC) of the battery 340 increases. For example, the KC may have a value of an exponential function shown in FIG. 3.

According to a calculation step 240, the controller 305 may calculate (or determine) a torque of the motor 330 corresponding to driving torque reduction request of the TCS 105 based on the discharging limit torque of the motor that is multiplied by the discharging torque control factor and the charging limit torque of the motor that is multiplied by the charging torque control factor. The discharging torque control factor and the charging torque control factor are determined in the determination step 225, the determination step 230, and the determination step 235. The controller 305 may determine the torque of the motor 330 as a value obtained by adding up a product of the discharging limit torque and the determined discharging torque control factor and a product of the charging limit torque and the determined charging torque control factor.

According to a calculation step 245, the controller 305 may calculate a torque of the engine 310 corresponding to the driving torque reduction request based on the calculated torque of the motor 330 and a request torque of the TCS 105. The controller 305 may calculate the torque of the engine 310 by subtracting the calculated torque of the motor from the request torque of the TCS 105.

The components, "~unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

What is claimed is:

1. A method for controlling torque reduction of a hybrid vehicle including a motor and an engine as power sources, the method comprising:
   determining, by a controller, a discharging torque control factor of the motor and a charging torque control factor of the motor based on a current state of charge of a battery that supplies an electric power to the motor and a threshold state of charge of the battery;
   calculating, by the controller, a torque of the motor corresponding to a driving torque reduction request of a traction control system (TCS) based on a discharging limit torque of the motor that the discharging torque control factor is reflected in and a charging limit torque of the motor that the charging torque control factor is reflected in;
   calculating, by the controller, a torque of the engine corresponding to the driving torque reduction request based on the calculated torque of the motor and a request torque of the traction control system (TCS);
   reducing, by the controller, the torque of the motor based on the calculated torque of the motor; and
   reducing, by the controller, the torque of the engine based on the calculated torque of the engine,
   wherein a target state of charge included in the threshold state of charge is a state of charge that decreases noise of the engine and maintains a state of charge of the battery, and
   wherein the controller is in communication with the traction control system (TCS).

2. The method of claim 1, wherein a limit state of charge included in the threshold state of charge is a state of charge that prevents deterioration of life of the battery.

3. The method of claim 2, wherein when the current state of charge is less than or equal to the limit state of charge, the controller determines the discharging torque control factor as zero, the controller determines the charging torque control factor as 1, and the controller determines the torque of the motor as a value obtained by adding up a product of the discharging limit torque and the determined discharging torque control factor and a product of the charging limit torque and the determined charging torque control factor.

4. The method of claim 2, wherein when the current state of charge is greater than the limit state of charge and the current state of charge is less than the target state of charge, the controller determines the discharging torque control factor as a value between zero and 1, the controller determines the charging torque control factor as a value between zero and 1, and the controller determines the torque of the motor as a value obtained by adding up a product of the discharging limit torque and the determined discharging torque control factor and a product of the charging limit torque and the determined charging torque control factor, and
   wherein the determined discharging torque control factor is a value that increases towards 1 when a state of charge of the battery increases and the determined charging torque control factor is a value that decreases towards zero when the state of charge of the battery increases.

5. The method of claim 2, wherein when the current state of charge is greater than or equal to the target state of charge, the controller determines the discharging torque control factor as 1, the controller determines the charging torque control factor as a value between zero and 1, and the controller determines the torque of the motor as a value obtained by adding up a product of the discharging limit torque and the determined discharging torque control factor and a product of the charging limit torque and the determined charging torque control factor, and
   wherein the determined charging torque control factor is a value of an exponential function when a state of charge of the battery increases.

6. The method of claim 2, wherein the controller calculates the torque of the engine by subtracting the calculated torque of the motor from the request torque of the traction control system (TCS).

7. A non-transitory computer readable medium containing program instructions that when executed by a processor perform the following steps:
   determining a discharging torque control factor of a motor and a charging torque control factor of the motor based on a current state of charge of a battery that supplies an electric power to the motor and a threshold state of charge of the battery;
   calculating a torque of the motor corresponding to a driving torque reduction request of a traction control system (TCS) based on a discharging limit torque of the motor that the discharging torque control factor is reflected in and a charging limit torque of the motor that the charging torque control factor is reflected in;
   calculating a torque of an engine corresponding to the driving torque reduction request based on the calculated torque of the motor and a request torque of the traction control system (TCS);
   reducing the torque of the motor based on the calculated torque of the motor; and
   reducing the torque of the engine based on the calculated torque of the engine, wherein a target state of charge included in the threshold state of charge is a state of charge that decreases noise of the engine and maintains a state of charge of the battery, and
   wherein the controller is in communication with the traction control system (TCS).

* * * * *